US012676824B2

(12) United States Patent
Phan et al.

(10) Patent No.: US 12,676,824 B2
(45) Date of Patent: Jul. 7, 2026

(54) SMART NETWORK INTERFACE CARD AND ARRANGEMENTS FOR REDUCING CABLING REQUIREMENTS IN RACK SYSTEMS

(71) Applicant: Super Micro Computer, Inc., San Jose, CA (US)

(72) Inventors: Manhtien Vo Phan, Morgan Hill, CA (US); John Chen, Fremont, CA (US); Hao Hung Chai, Taipei (TW)

(73) Assignee: Super Micro Computer, Inc., San Jose, CA (US)

( * ) Notice: Subject to any disclaimer, the term of this patent is extended or adjusted under 35 U.S.C. 154(b) by 302 days.

(21) Appl. No.: 18/636,655

(22) Filed: Apr. 16, 2024

(65) Prior Publication Data

US 2025/0323880 A1     Oct. 16, 2025

(51) Int. Cl.
*H04L 49/40*        (2022.01)
*H04L 49/15*        (2022.01)
*H04L 49/351*       (2022.01)

(52) U.S. Cl.
CPC ............ *H04L 49/405* (2013.01); *H04L 49/15* (2013.01); *H04L 49/351* (2013.01)

(58) Field of Classification Search
CPC ..... H04L 49/405; H04L 49/15; H04L 49/351; H04L 49/35; H04L 49/1507
See application file for complete search history.

(56) References Cited

U.S. PATENT DOCUMENTS

| | | | | |
|---|---|---|---|---|
| 11,375,300 B2 * | 6/2022 | Sagie | ................. | H04Q 11/0071 |
| 11,917,083 B2 * | 2/2024 | Bing | ....................... | G06F 21/57 |
| 2015/0254201 A1 * | 9/2015 | Billi | .................... | G06F 13/4022 |
| | | | | 710/316 |

OTHER PUBLICATIONS

"What is an RJ45 Connector?", Anixter, https://www.anixter.com/en_us/resources/literature/techbriefs/what-is-an-rj45-connector.html, Downloaded Apr. 13, 2024.
"Supermicro AS—4125GS-TNRT 4U GPU SuperServer", Supermicro, https://store.supermicro.com/us_en/4u-gpu-superserver-as-4125gs-tnrt-pre-config.1.html?%20gl=%201%20%2Azjw6e0%_2A_ga%2AMTcyNzOOODExNy4xNz_Ey, Downloaded Apr. 13, 2024.
Kevin Deierling, "What Is a SmartNIC?", NVIDIA Blog, https://blogs.nvidia.comlblog/what-is-a-smartnic/, Oct. 29, 2021.
Artur Jaworski, "SmartNIC vs. NIC: what is the difference?", CodiLime, https://codilime.com/blog/smartnic-Vs-nic/, Downloaded Apr. 13, 2024.
"Small Form-factor Pluggable", Wikipedia, https://en.wikipedia.org/wiki/Small_Form-factor_Pluggable, Downloaded Apr. 13, 2024.

* cited by examiner

*Primary Examiner* — Idriss N Alrobaye
*Assistant Examiner* — Richard B Franklin
(74) *Attorney, Agent, or Firm* — Beyer Law Group LLP

(57) ABSTRACT
A computing device has several smart network interface cards (NICs) with RJ45 connectors. The smart NICs are in master-slave arrangement, where internal RJ45 connectors of the master smart NIC are connected by RJ45 cables to respective RJ45 connectors of slave smart NICs. A front RJ45 connector of the master smart NIC is connected by an RJ45 cable to a network switch that is installed in a same rack as the computing device.

19 Claims, 8 Drawing Sheets

SMART NETWORK INTERFACE CARD AND ARRANGEMENTS FOR REDUCING CABLING REQUIREMENTS IN RACK SYSTEMS

TECHNICAL FIELD

The present disclosure is directed to computing devices.

BACKGROUND

Data centers and other computing facilities have a plurality of computing devices, such as server computers, storage units, etc. that are mounted in racks. A rack may include a so-called top of rack (TOR) switch, which is a network switch that is connected to network interface cards (NICs) of computing devices in the rack. Despite its name, the TOR switch may be installed at the top of the rack, the bottom of the rack, or in between. The TOR switch acts as a central connection point, allowing computing devices in the rack to communicate with each other and with external networks.

A rack may have one or more TOR switches. For example, NICs of server computers in the rack may be connected to a TOR switch, whereas NICs of storage units in the rack may be connected to another TOR switch. A rack may also have a single TOR switch where all NICs in the rack are connected. NICs are connected to the TOR switch by way of network interface cables that are usually routed at the front of the rack. Examples of these network interface cables include fiber optic cables that connect to Small Form-factor Pluggable (SFP) modules and RJ45 cables that connect to RJ45 connectors. The number of network interface cables in the rack not only increases cost but also creates operational issues in terms of maintenance, air flow, identification, etc.

BRIEF SUMMARY

In one embodiment, a rack system comprises a rack, a top of rack (TOR) switch that is housed in the rack, and a computing device. The computing device comprises: a chassis that is housed in the rack; a motherboard in the chassis; a master smart network interface card (NIC) that is removably plugged to a corresponding bus slot of the motherboard, the master smart NIC comprising a Small Form-factor Pluggable (SFP) module, an Ethernet switch, a front RJ45 connector that is connected to the Ethernet switch, and a plurality of internal RJ45 connectors that are connected to the Ethernet switch; and a plurality of slave smart NICs that are removably plugged to corresponding bus slots of the motherboard, each of the slave smart NICs comprising an SFP module and an RJ45 connector. The rack system further includes a first RJ45 cable that connects the front RJ45 connector of the master smart NIC to the TOR switch, a second RJ45 cable that connects a first internal RJ45 connector of the plurality of internal RJ45 connectors of the master smart NIC to an RJ45 connector of a first slave smart NIC of the plurality of slave smart NICs, and a third RJ45 cable that connects a second internal RJ45 connector of the plurality of internal RJ45 connectors of the master smart NIC to an RJ45 connector of a second slave smart NIC of the plurality of slave smart NICs.

In another embodiment, a computing device comprises: a chassis; a motherboard in the chassis, the motherboard comprising a plurality of bus slots and at least one processor; a master smart NIC that is removably plugged to a corresponding bus slot of the plurality of bus slots, the master smart NIC comprising an SFP module, an Ethernet switch, a front RJ45 connector that is connected to the Ethernet switch, and a plurality of internal RJ45 connectors that are connected to the Ethernet switch; and a plurality of slave smart NICs that are removably plugged to corresponding bus slots of the plurality of bus slots, each of the slave smart NICs comprising an SFP module and an RJ45 connector, wherein a first RJ45 cable connects a first internal RJ45 connector of the plurality of internal RJ45 connectors of the master smart NIC to an RJ45 connector of a first slave smart NIC of the plurality of slave smart NICs, and a second RJ45 cable connects a second internal RJ45 connector of the plurality of internal RJ45 connectors of the master smart NIC to an RJ45 connector of a second slave smart NIC of the plurality of slave smart NICs.

In yet another embodiment, a smart network interface card (NIC) comprises a Small Form-factor Pluggable (SFP) module; an Ethernet switch; a front RJ45 connector that is connected to the Ethernet switch, wherein the front RJ45 connector is mounted on a circuit board facing toward a front of the smart NIC; at least one internal RJ45 connector that is connected to the Ethernet switch, wherein the at least one internal RJ45 connector is mounted on the circuit board facing toward a back or toward a top of the smart NIC; and a bus connector on the circuit board, the bus connector is configured to be removably connected to a bus slot of a motherboard.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. The figures are not drawn to scale.

DETAILED DESCRIPTION

In the present disclosure, numerous specific details are provided, such as examples of components, structures, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
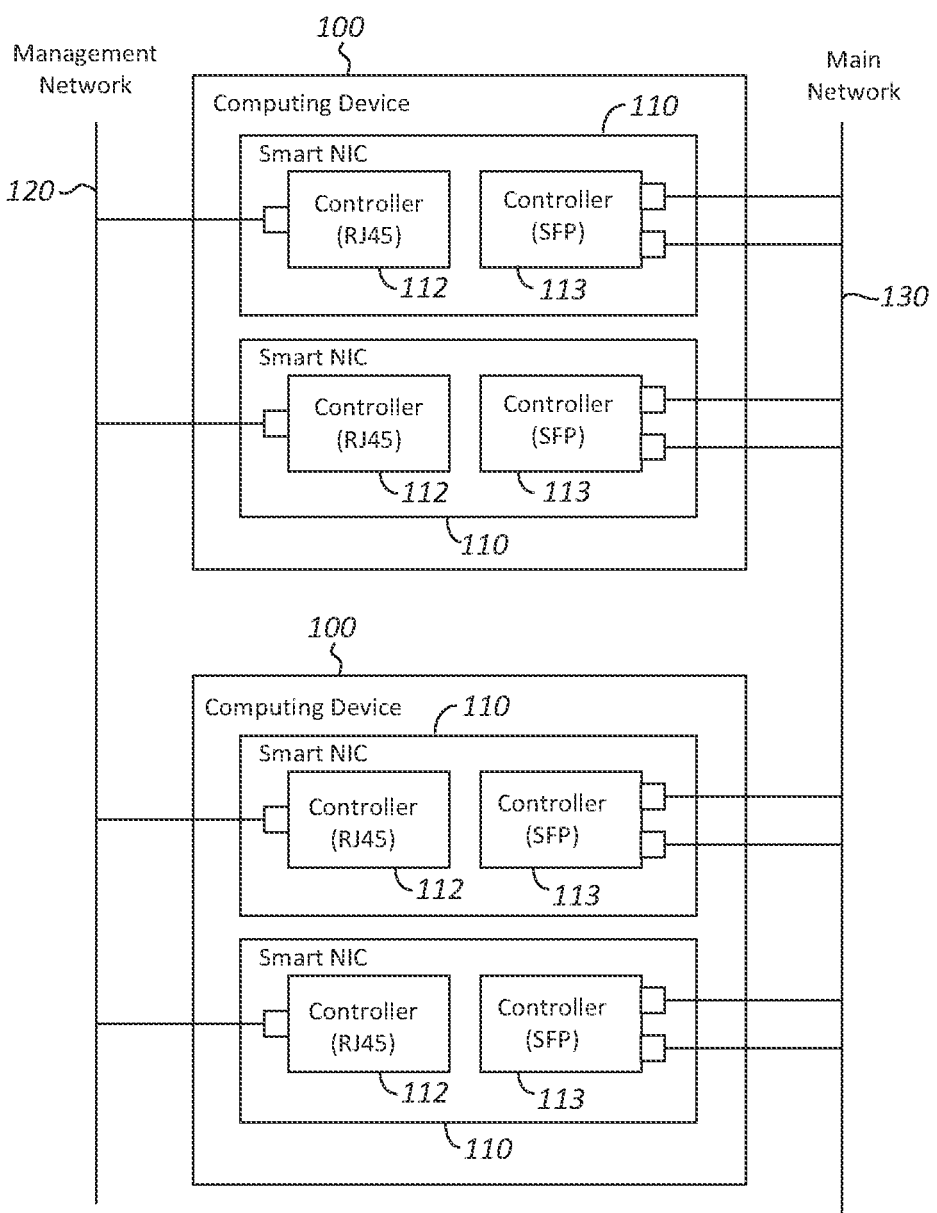
FIG. 1 schematically illustrates an electrical configuration of a computing device, in accordance with an embodiment of the present invention.

FIG. 1 schematically illustrates an electrical configuration of a computing device 100, in accordance with an embodiment of the present invention. The computing device 100 may comprise a server computer, storage unit, or other network-connected device that removably accepts a smart network interface card (NIC) 110. Only two computing devices 100 are shown for clarity of illustration. In practice, a data center may have a plurality of racks, with each rack housing a plurality of computing devices 100.

A computing device 100 includes at least one processor, a memory, and other electrical components. The computing device 100 further includes an input/output (I/O) bus, which in one embodiment is a Peripheral Component Interface Express (PCIe) bus. The computing device 100 has a plurality of PCIe bus slots, which each slot accepting an I/O card, such as a smart NIC 110. In the example of FIG. 1, only two smart NICs 110 are shown for clarity of illustration. However, 4, 8, etc. smart NICs 110 may be connected to the I/O bus of the computing device 100.

Each smart NIC 110 has a network interface controller 113 that connects to a main network 130, and a network interface controller 112 that connects to a management network 120. The main network 130 and management network 120 are separate computer networks for security reasons.

The main network 130 is a high-speed Ethernet network that is used for normal network communications. The network interface controller 113 may be a network interface controller for a Small Form-factor Pluggable (SFP) module (not shown in FIG. 1), such as a Quad Small Form-factor Pluggable (QSFP) module or Octal Small Form-factor Pluggable (OSFP) module. A fiber optic cable connects the SFP module to the main network 130. The fiber optic cable may be compatible with Multi-fiber Termination Push-on (MTP) and Multi-fiber Push On (MPO) connectors or Lucent Connector (LC) connectors, for example.

The management network 120 is an Ethernet network that is used to communicate with the smart NIC 110 for configuration, troubleshooting, or other management-related operations. The network interface controller 112 may be a Baseboard Management Controller (BMC), a microcontroller, or other electrical circuit that interfaces with the management network 120 by way of an RJ45 connector (not shown in FIG. 1). Although all controllers 112 on a computing device 100 may be connected to the management network 120, only one of the RJ45 connectors needs to be connected to a TOR switch by way of an RJ45 cable. This is because, as will be more apparent below, RJ45 cable connections may be routed to a smart NIC 110 from other smart NICs in the computing device 100.

Figure 2:
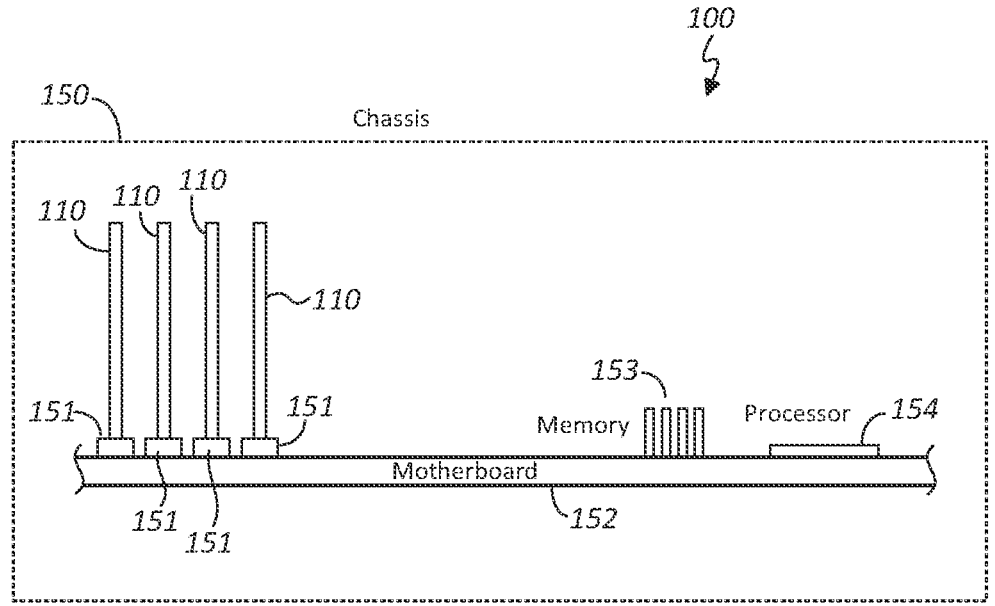
FIG. 2 schematically illustrates a physical configuration of a computing device, in accordance with an embodiment of the present invention.

FIG. 2 schematically illustrates a physical configuration of a computing device 100, in accordance with an embodiment of the present invention. The computing device 100 includes a chassis 150, which in one embodiment is rack mountable. Housed within the chassis 150 is a motherboard 152 that has a plurality of PCIe bus slots 151. Each smart NIC 110 is removably connected to a bus slot 151. Mounted on the motherboard 152 are at least one processor 154, memory 153, and other electronic components depending on the type of the computing device 100.

Figure 3:
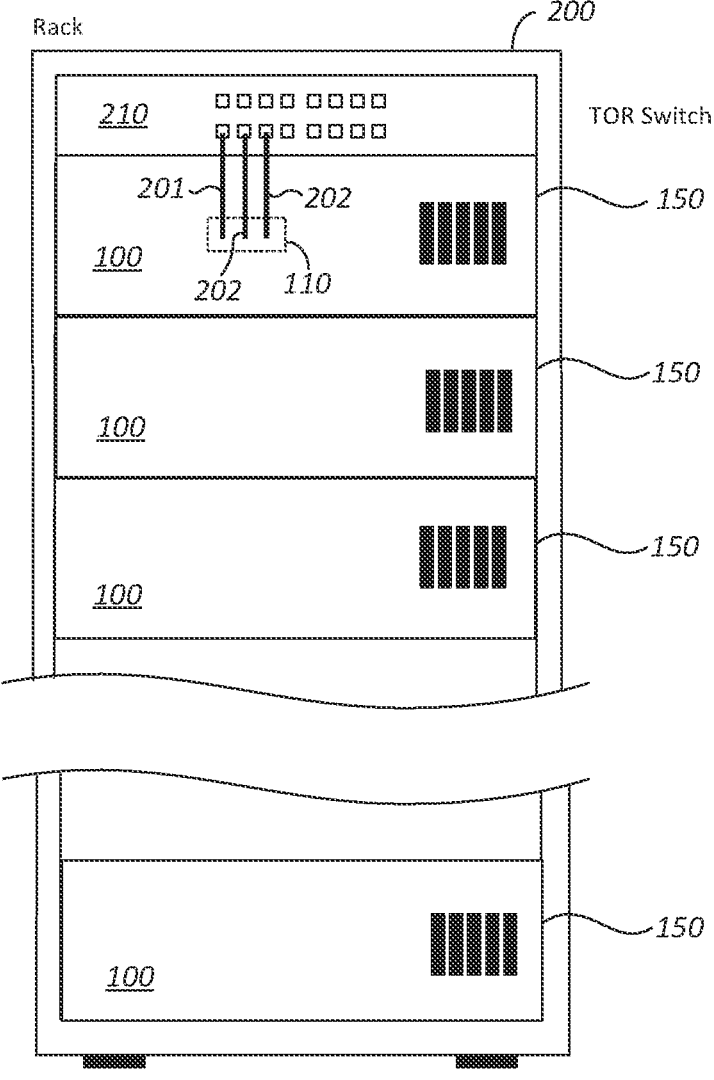
FIG. 3 shows a rack system, in accordance with an embodiment of the present invention.

FIG. 3 shows a rack system, in accordance with an embodiment of the present invention. In the example of FIG. 3, the rack system includes a rack 200, at least one TOR switch 210, and a plurality of computing devices 100. The rack 200 may be a 19-inch rack that is typically used in data centers. For example, the rack 200 may be a 19-inch 48U rack. The chassis 150 of the computing devices 100 is installed in the rack 200. A computing device 100 may be, for example, a 4U server computer, meaning the chassis 150 of the server computer occupies 4 rack units of the rack 200

In the example of FIG. 3, a TOR switch 210 is an Ethernet switch that is installed at the top of the rack 200. As previously noted, a TOR switch 210 is not necessarily stored at the top of a rack. Only one TOR switch 210 is shown in FIG. 3 for clarity of illustration. Generally, a rack 200 may have a plurality of TOR switches 210, one for each type of computing devices housed in the rack 200. For example, the rack 200 may have a first TOR switch 210 for all storage units, a second TOR switch 210 for all server computers, etc.

FIG. 3 shows the front of the rack 200. In a typical data center, network interface cables to the TOR switch 210 are routed at the front of the rack 200. As an example, FIG. 3 shows an RJ45 cable 201 (e.g., twisted pair) that connects an RJ45 connector of a smart NIC 110 of a computing device 100 to a corresponding connector on the TOR switch 210, and fiber optic cables 202 that connect SFP modules of the smart NIC 110 to corresponding connectors on the TOR switch 210. The number of network interface cables going from a computing device 100 to the TOR switch 210 depends on the number of smart NICs 110 in the computing device 100.

Figure 4:
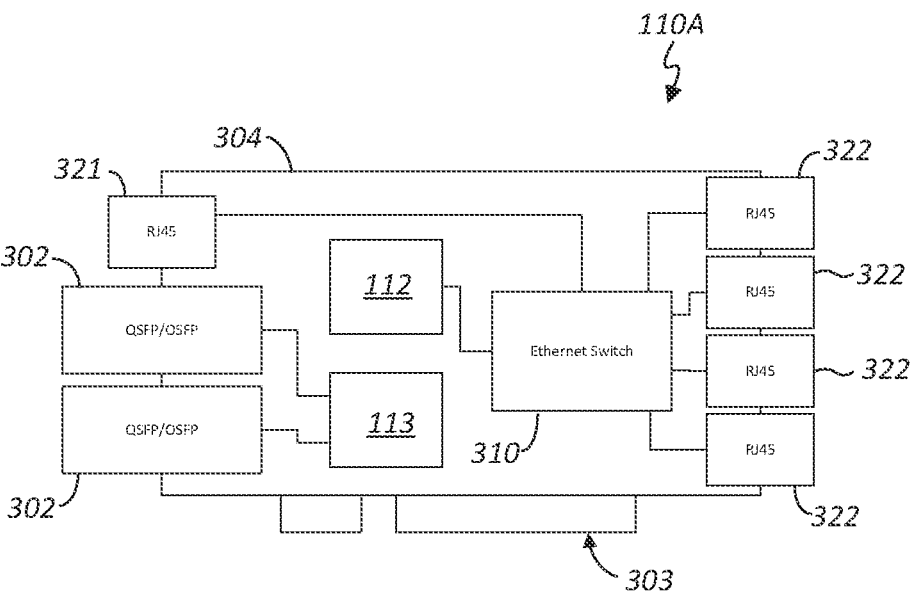
FIG. 4 shows a side view of a smart NIC, in accordance with an embodiment of the present invention.

FIG. 4 shows a side view of a smart NIC 110A, in accordance with an embodiment of the present invention. The smart NIC 110A is a particular embodiment of a smart NIC 110. The smart NIC 110A comprises a circuit board 304 and a bus connector 303. The smart NIC 110A has a half-length, half-height form factor.

In one embodiment, the bus connector 303 is a PCIe bus connector that removably connects to the PCIe bus of a computing device 100 by way of a bus slot 151 of a motherboard 152 (shown in FIG. 2). The smart NIC 110A includes SFP modules 302, which may be QSFP or OSFP modules, for example. The smart NIC 110A further includes a plurality of RJ45 connectors that are connected to a multiport Ethernet switch 310. The RJ45 connector at the front of the smart NIC 110 (i.e., facing toward the front of the smart NIC 110/rack 200) is labeled as 321, and the RJ45 connectors at the back of the smart NIC 110 (i.e., facing toward the back of the rack 200/smart NIC 110) are labeled as 322. In the example of FIG. 4, the smart NIC 110A has a single RJ45 connector 321 at the front and four RJ45 connectors 322 at the back that are connected to the Ethernet switch 310. The Ethernet switch 310 may be a conventional, multiport Ethernet switch integrated circuit (IC), such as those commercially available from Realtek Semiconductor Corp.

As will be more apparent below, the RJ45 connectors of smart NICs 110 of a computing device 100 may be connected in master-slave arrangement to minimize the number of RJ45 cables that go from the computing device 100 to a corresponding TOR switch 210. In that arrangement, a front RJ45 connector of a master smart NIC 110 may be cabled to the TOR switch 210, and RJ45 connectors of slave smart NICs 110 may be cabled to other RJ45 connectors (e.g., back or top RJ45 connectors) of the master smart NIC 110. The Ethernet switch 310 switches network traffic received at the other RJ45 connectors of the master smart NIC 110 to the front RJ45 connector of the master NIC 110, thereby allowing the received network traffic to reach the TOR switch 210. Also, the Ethernet switch 310 switches network traffic received at the front RJ45 connector of the master smart NIC 110 to one of the other RJ45 connectors of the master NIC 110 that is destined to receive the network traffic.

Figure 5:
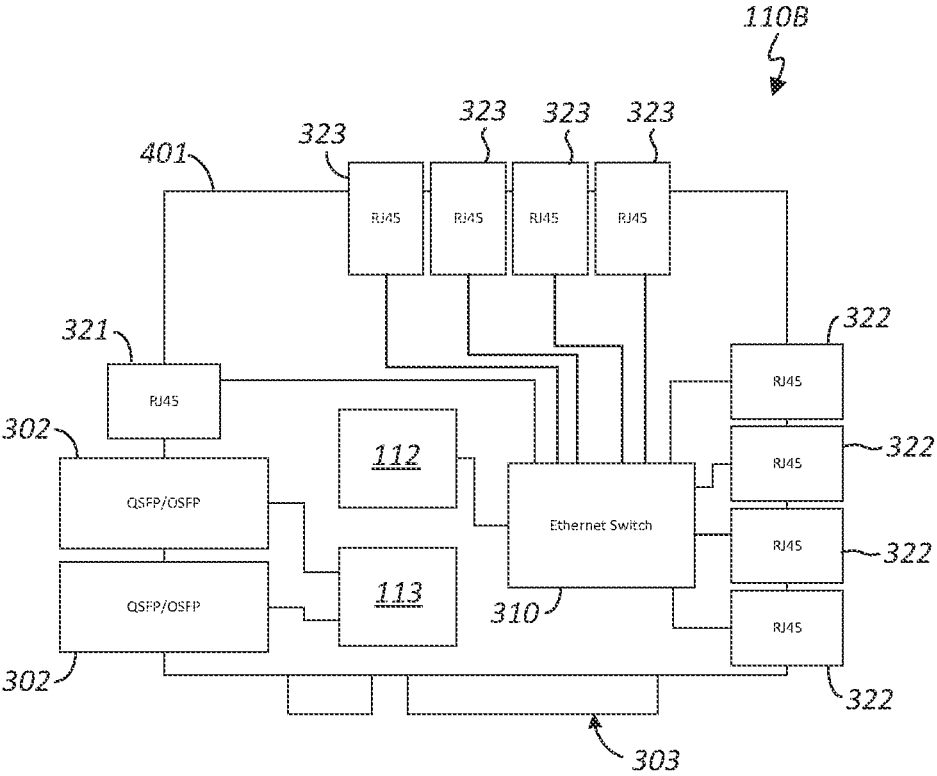
FIG. 5 shows a side view of a smart NIC, in accordance with another embodiment of the present invention.

FIG. 5 shows a side view of a smart NIC 110B, in accordance with an embodiment of the present invention. The smart NIC 110B is a particular embodiment of a smart NIC 110. The smart NIC 110B is the same as the smart NIC 110A, except that the smart NIC 110B has a circuit board 401 and additional RJ45 connectors 323 at the top of the circuit board 401 (i.e., facing toward the top of the rack 200/smart NIC 110B). In the example of FIG. 5, the smart NIC 110B has a single RJ45 connector 321 at the front, four RJ45 connectors 322 at the back, and four RJ45 connectors 323 at the top. RJ45 connectors that accept RJ45 cables from inside the chassis 150 of the computing device 100, such as RJ45 connectors 322 and 323, are also referred to herein as internal RJ45 connectors.

The smart NIC 110B has a half-length, full-height form factor, and thus has more circuit board space than the smart NIC 110A. This allows the smart NIC 110B to accommodate, in addition to the RJ45 connector 321 and RJ45 connectors 322, the RJ45 connectors 323 at the top of the circuit board 401. The RJ45 connectors 323 are connected to the Ethernet switch 310. The smart NIC 110B and smart NIC 110A are otherwise the same.

Figure 6:
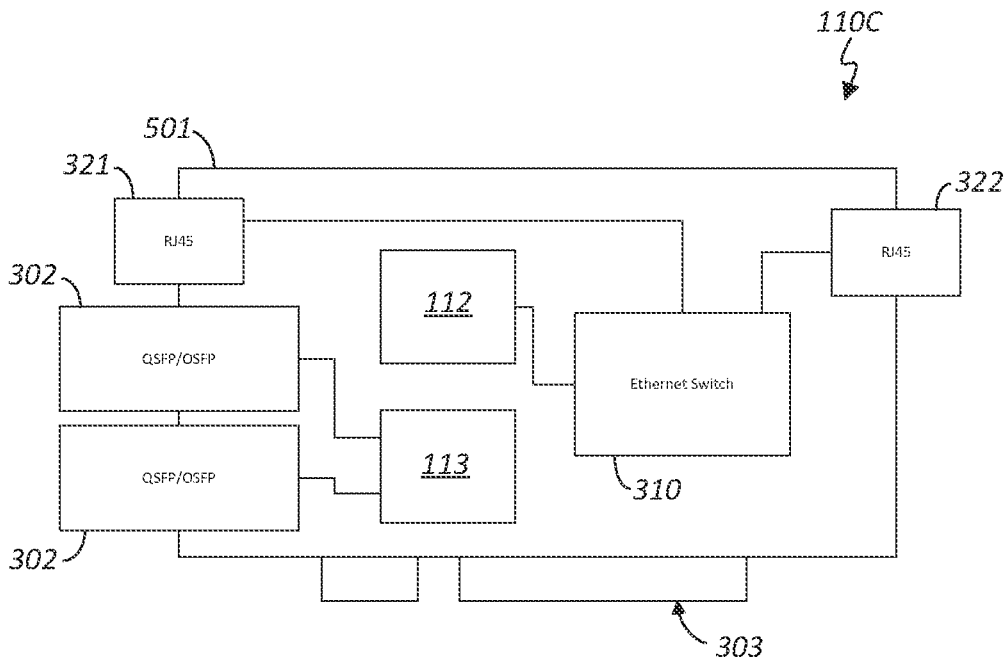
FIG. 6 shows a side view of a smart NIC, in accordance with yet embodiment of the present invention.

FIG. 6 shows a side view of a smart NIC 110C, in accordance with an embodiment of the present invention. The smart NIC 110C is a particular embodiment of a smart NIC 110. The smart NIC 110C is the same as the smart NIC 110A, except that the smart NIC 110C has a circuit board 501 and fewer RJ45 connectors. In the example of FIG. 6, the smart NIC 110C has a single RJ45 connector 321 at the front and a single RJ45 connector 322 at the back.

Like the smart NIC 110A, the smart NIC 110C has a half-length, half-height form factor. But unlike the smart NIC 110A, the smart NIC 110C only has two RJ45 connectors. However, this is not an issue, and is actually a benefit in terms of cost, when used as a slave in a master-slave arrangement. The smart NIC 110C and smart NIC 110A are otherwise the same.

Figure 7:
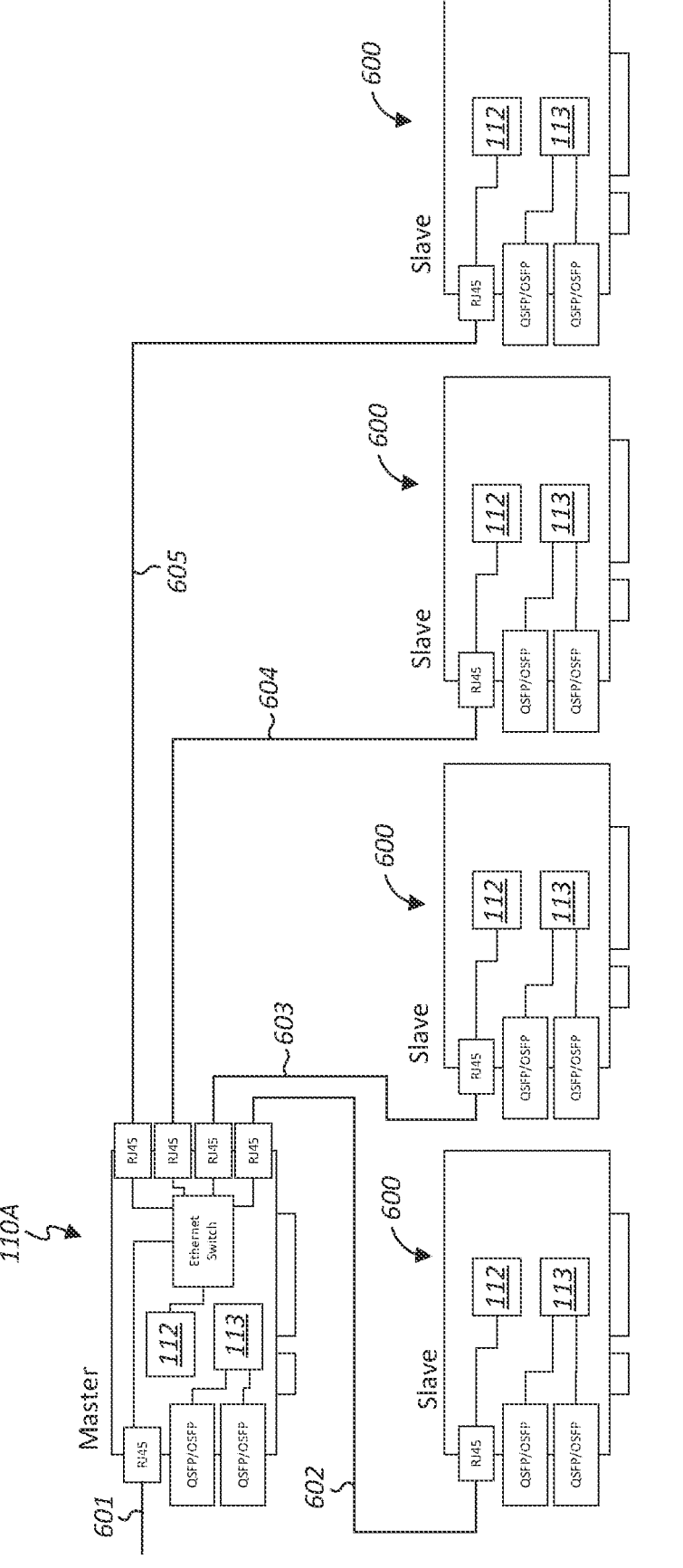
FIG. 7 shows a plurality of smart NICs that are in master-slave arrangement, in accordance with an embodiment of the present invention.

FIG. 7 shows a plurality of smart NICs that are in master-slave arrangement, in accordance with an embodiment of the present invention. In the example of FIG. 7, a plurality of smart NICs 600 is configured as slaves and a smart NIC 110A is configured as a master in the master-slave arrangement. The smart NICs 600 may be conventional smart NICs, which have no internal RJ45 connectors and no Ethernet switch. In one embodiment, the master smart NIC 110A and slave smart NICs 600 are all plugged to corresponding bus slots 151 of the motherboard 152 of the computing device 100.

In the example of FIG. 7, an RJ45 cable 601 connects a front RJ45 connector of the master smart NIC 110A (see FIG. 4, RJ45 connector 321) to a TOR switch 210. An RJ45 cable connects an internal RJ45 connector (see FIG. 4, RJ45 connector 322) of the master smart NIC 110A to a front RJ45 connector of a corresponding slave smart NIC 600. More particularly, RJ45 cables 602-605 connect back RJ45 connectors of the master smart NIC 110A to corresponding RJ45 connectors of slave smart NICs 600. Fiber optic cables connect the SFP modules of the master smart NIC 110A and slave smart NICs 600 to the TOR switch 210.

Figure 8:
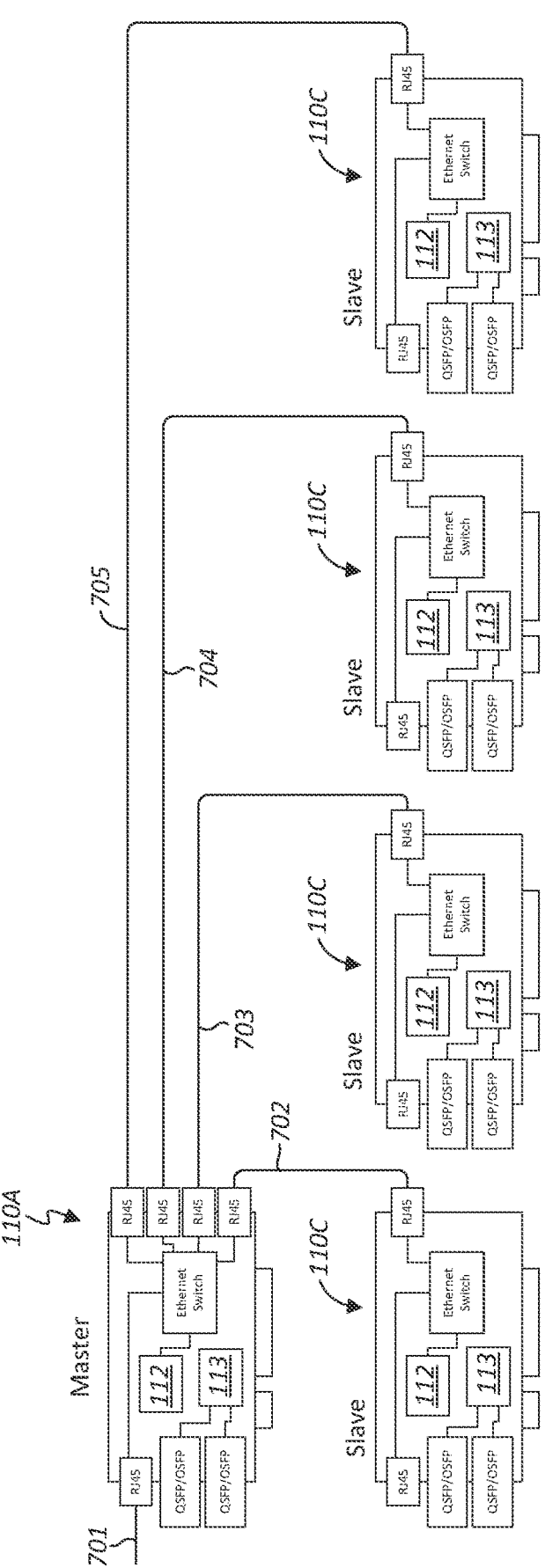
FIG. 8 shows a plurality of smart NICs that are in master-slave arrangement, in accordance with another embodiment of the present invention.

FIG. 8 shows a plurality of smart NICs that are in master-slave arrangement, in accordance with another embodiment of the present invention. In the example of FIG. 8, a plurality of smart NICs 110C is configured as slaves and a smart NIC 110A is configured as a master in the master-slave arrangement. In one embodiment, the master smart NIC 110A and slave smart NICs 110C are all plugged to corresponding bus slots 151 of the motherboard 152 of the computing device 100. The use of smart NICs 110C allow RJ45 cables that are not plugged to the TOR switch 210 to remain within the chassis 150 of the computing device 100

In the example of FIG. 8, an RJ45 cable 701 connects a front RJ45 connector of the master smart NIC 110A to a TOR switch 210. An RJ45 cable connects an internal RJ45 connector of the master smart NIC 110A to a back RJ45 connector of a corresponding slave smart NIC 110C (see FIG. 6, RJ45 connector 322). More particularly, RJ45 cables 702-705 connect back RJ45 connectors of the master smart NIC 110A to corresponding back RJ45 connectors of slave smart NICs 110C. Fiber optic cables connect the SFP modules of the master smart NIC 110A and slave smart NICs 110C to the TOR switch 210.

Figure 9:
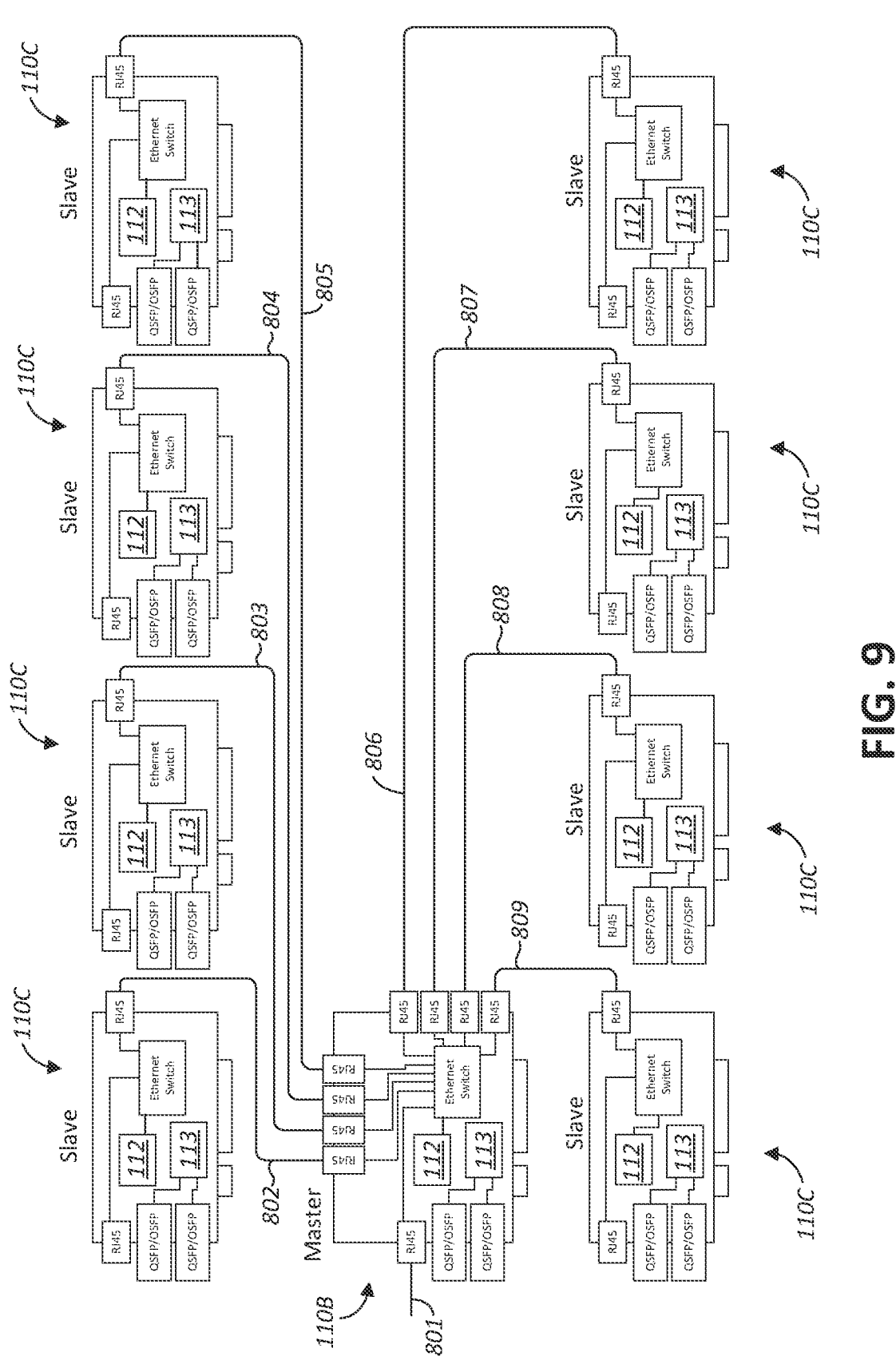
FIG. 9 shows a plurality of smart NICs that are in master-slave arrangement, in accordance with yet another embodiment of the present invention.

FIG. 9 shows a plurality of smart NICs that are in master-slave arrangement, in accordance with another embodiment of the present invention. In the example of FIG. 9, a plurality of smart NICs 110C is configured as slaves and a smart NIC 110B is configured as a master in the master-slave arrangement. Because the smart NIC 110B may have eight internal RJ45 connectors (see FIG. 5, RJ45 connectors 323 and RJ45 connectors 322), the master-slave arrangement of FIG. 9 can accommodate eight slave smart NICs. In one embodiment, the master smart NIC 110B and slave smart NICs 110C are all plugged to corresponding bus slots 151 of the motherboard 152 of the computing device 100. The use of smart NICs 110C allow RJ45 cables that are not plugged to the TOR switch 210 to remain within the chassis 150 of the computing device 100

In the example of FIG. 9, an RJ45 cable 801 connects a front RJ45 connector of the master smart NIC 110B to a TOR switch 210. An RJ45 cable connects an internal RJ45 connector of the master smart NIC 110B to a back RJ45 connector of a corresponding slave smart NIC 110C. More particularly, RJ45 cables 802-809 connect internal RJ45 connectors of the master smart NIC 110B to corresponding back RJ45 connectors of slave smart NICs 110C. Fiber optic cables connect the SFP modules of the master smart NIC 110B and slave smart NICs 110C to the TOR switch 210.

As can be appreciated, other master-slave arrangements involving smart NICs 110 are also possible. For example, any of the smart NICs 110A, 110B, or 110C may be used as a master depending on the number of slave smart NICs. Similarly, any of the smart NICs 110A, 110B, or 110C may be used as a slave. Furthermore, the number of smart NICs 110 and/or the number of RJ45 connectors that are switched within a smart NIC 110 may be increased to increase the number of smart NICs in a computing device 100.

Embodiments of the present invention advantageously reduce the number of RJ45 cables that extend out of a computing device. As a particular example, assume a computing device has 4 smart NICs. In that example, 4 RJ45 cables and 8 fiber optic cables are needed to connect the computing device to the TOR switch in conventional fashion. In contrast, with embodiments of the present invention, the computing device will only need 1 RJ45 cable for the front RJ45 connector and 8 fiber optic cables for SFP modules to connect the computing device to the TOR switch. The reduction in the number of RJ45 cables that connect to the TOR switch becomes more significant as additional smart NICs are installed in the computing device and as additional computing devices are installed in the rack, such as in artificial intelligence (AI)/machine learning applications.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A rack system computing comprising:

a rack;

a top of rack (TOR) switch that is installed in the rack;

a computing device that is separate from the TOR switch, the computing device comprising:

a chassis that is installed the rack;

a motherboard in the chassis, the motherboard comprising a plurality of bus slots and at least one processor;

a master smart network interface card (NIC) that is removably plugged to a corresponding bus slot of the plurality of bus slots, the master smart NIC comprising a Small Form-factor Pluggable (SFP) module, an Ethernet switch, a front RJ45 connector that is connected to the Ethernet switch, and a plurality of internal RJ45 connectors that are connected to the Ethernet switch; and a plurality of slave smart NICs that are removably plugged to corresponding bus slots of the plurality of bus slots, each of the slave smart NICs comprising an SFP module and an RJ45 connector;

a first RJ45 cable that connects the front RJ45 connector of the master smart NIC to the TOR switch;

a second RJ45 cable that connects a first internal RJ45 connector of the plurality of internal RJ45 connectors of the master smart NIC to an RJ45 connector of a first slave smart NIC of the plurality of slave smart NICs; and a third RJ45 cable that connects a second internal RJ45 connector of the plurality of internal RJ45 connectors of the master smart NIC to an RJ45 connector of a second slave smart NIC of the plurality of slave smart NICs.

2. The rack system of claim 1, wherein the second RJ45 cable and the third RJ45 cable are disposed within the chassis of the computing device.

3. The rack system of claim 1, wherein the SFP modules of the master smart NIC and of the plurality of slave smart NICs are Quad Small Form-factor Pluggable (QSFP) modules or Octal Small Form-factor Pluggable (OSFP) modules.

4. The rack system of claim 1, wherein the RJ45 connector of each of the plurality of slave smart NICs is facing toward a back of the rack.

5. The rack system of claim 1, wherein the computing device is a server computer.

6. The rack system of claim 1, wherein each of the plurality of bus slots is a Peripheral Component Interface Express (PCIe) bus slot.

7. A computing device comprising:

a chassis;

a motherboard in the chassis, the motherboard comprising a plurality of bus slots and at least one processor;

a master smart network interface card (NIC) that is removably plugged to a corresponding bus slot of the plurality of bus slots, the master smart NIC comprising a Small Form-factor Pluggable (SFP) module, an Ethernet switch, a front RJ45 connector that is connected to the Ethernet switch, and a plurality of internal RJ45 connectors that are connected to the Ethernet switch; and a plurality of slave smart NICs that are removably plugged to corresponding bus slots of the plurality of bus slots, each of the slave smart NICs comprising an SFP module and an RJ45 connector, wherein a first RJ45 cable connects a first internal RJ45 connector of the plurality of internal RJ45 connectors of the master smart NIC to an RJ45 connector of a first slave smart NIC of the plurality of slave smart NICs, and a second RJ45 cable connects a second internal RJ45 connector of the plurality of internal RJ45 connectors of the master smart NIC to an RJ45 connector of a second slave smart NIC of the plurality of slave smart NICs.

8. The computing device of claim 7, wherein a third RJ45 cable connects the front RJ45 connector of the master smart NIC to a top of rack (TOR) switch that is installed in a same rack as the computing device.

9. The computing device of claim 7, wherein the first RJ45 cable and the second RJ45 cable are disposed within the chassis of the computing device.

10. The computing device of claim 7, wherein the SFP modules of the master smart NIC and of the plurality of slave smart NICs are Quad Small Form-factor Pluggable (QSFP) modules or Octal Small Form-factor Pluggable (OSFP) modules.

11. The computing device of claim 7, wherein the RJ45 by connector of each of the slave smart NICs is facing toward a back of the slave smart NIC.

12. The computing device of claim 7, wherein the computing device is a server computer.

13. The computing device of claim 7, wherein each of the plurality of bus slots is a Peripheral Component Interface Express (PCIe) bus slot.

14. A smart network interface card (NIC) comprising:

a Small Form-factor Pluggable (SFP) module;

an Ethernet switch;

a front RJ45 connector that is connected to the Ethernet switch, wherein the front RJ45 connector is mounted on a circuit board facing toward a front of the smart NIC;

at least one internal RJ45 connector that is connected to the Ethernet switch, wherein the at least one internal RJ45 connector is mounted on the circuit board facing toward a back or toward a top of the smart NIC; and a bus connector on the circuit board, the bus connector is configured to be removably connected to a bus slot of a motherboard.

15. The smart NIC of claim 14, wherein a first RJ45 cable connects the front RJ45 connector of the smart NIC to a top of rack (TOR) switch that is installed in a same rack as a computing device that includes the smart NIC.

16. The smart NIC of claim 15, wherein a second RJ45 cable connects the at least one internal RJ45 connector of the smart NIC to an RJ45 connector of another smart NIC that is in a same computing device as the smart NIC.

17. The smart NIC of claim 16, wherein each of the smart NIC and the other smart NIC is plugged to a Peripheral Component Interface Express (PCIe) bus slot of a motherboard of the same computing device.

18. The smart NIC of claim 14, wherein the SFP module is a Quad Small Form-factor Pluggable (QSFP) module or Octal Small Form-factor Pluggable (OSFP) module.

19. The smart NIC of claim 14, wherein the at least one internal RJ45 connector is one of a plurality of internal RJ45 connectors that are mounted on the circuit board facing toward a back or toward a top of the smart NIC.

\* \* \* \* \*